(12) United States Patent
Swanto et al.

(10) Patent No.: US 12,274,253 B1
(45) Date of Patent: Apr. 15, 2025

(54) TIP-UP APPARATUS FOR ICE FISHING

(71) Applicants: Harold Swanto, Muskego, WI (US);
Tami Swanto, Muskego, WI (US)

(72) Inventors: Harold Swanto, Muskego, WI (US);
Tami Swanto, Muskego, WI (US)

( * ) Notice: Subject to any disclaimer, the term of this patent is extended or adjusted under 35 U.S.C. 154(b) by 0 days.

(21) Appl. No.: 18/382,486

(22) Filed: Oct. 21, 2023

(51) Int. Cl.
*A01K 97/01* (2006.01)
*A01K 97/12* (2006.01)

(52) U.S. Cl.
CPC .............. *A01K 97/01* (2013.01); *A01K 97/12* (2013.01)

(58) Field of Classification Search
CPC ................................ A01K 97/01; A01K 97/12
See application file for complete search history.

(56) References Cited

U.S. PATENT DOCUMENTS

| | | | | |
|---|---|---|---|---|
| 2,773,326 A * | 12/1956 | Calvert | ................. | A01K 97/01 43/16 |
| 5,235,773 A | 8/1993 | Rinehart | | |
| 5,488,796 A * | 2/1996 | Taylor | .................... | A01K 97/01 43/17 |
| 5,979,101 A * | 11/1999 | Muenchow | ............ | A01K 97/01 43/17 |
| 7,008,086 B1 * | 3/2006 | Kell | ..................... | A01K 97/125 362/431 |
| D533,207 S | 12/2006 | Kennedy | | |
| 7,207,133 B2 | 4/2007 | Schiemann | | |
| 8,497,778 B1 | 7/2013 | Martin | | |
| 9,392,779 B1 | 7/2016 | Dahlberg | | |
| 9,474,261 B1 * | 10/2016 | Rayfield | ................ | A01K 97/11 |
| D788,255 S | 5/2017 | Rayfield | | |
| 10,188,088 B2 * | 1/2019 | Zdroik | .................... | A01K 97/00 |
| 2022/0142133 A1 * | 5/2022 | Wichert | .......... | A01K 89/01931 |

FOREIGN PATENT DOCUMENTS

CA 2379911 9/2002

OTHER PUBLICATIONS

Vexan Ice Fishing https://www.amazon.com/Vexan-Ice-Fishing-Tip-Ups/dp/B0CC318Z3V?th=1 (Year: 2023).*

* cited by examiner

Primary Examiner — Richard G Davis

(57) ABSTRACT

A tip-up apparatus for indicating when a fish has been caught on a fishing line during ice fishing includes a base and an indicator coupled to the base which moves from a retracted position to an extended position with respect to the base when a tripper assembly is actuated. The tripper assembly is actuatable by the fish pulling on the fishing line attached to the tripper assembly. A circuit is coupled to the indicator and is configured to activate a light emitter and transmit a signal to a remote electronic device when the indicator moves to the extended position. The base is collapsible.

17 Claims, 11 Drawing Sheets

TIP-UP APPARATUS FOR ICE FISHING

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to tip-up apparatuses and more particularly pertains to a new tip-up apparatus for indicating when a fish has been caught on a fishing line during ice fishing.

(2) Description of Related Art Including Information Disclosed Under 37 CFR 1.97 and 1.98

The prior art discloses myriad tip-up apparatuses for indicating when a fish is caught on a fishing line during ice fishing, including apparatuses in which an indicator is released from a retracted position and biasedly moves to an extended position when a fish actuates a tripper assembly. The prior art also describes apparatuses which send a wireless signal to a remote electronic device to indicate that the fish has been caught onto the fishing line. The prior art does not, however, disclose such an apparatus in which a light emitter positioned on the indicator is activated when the tripper assembly is actuated. The prior art further does not describe such an apparatus in which a base of the tip-up apparatus comprises a pair of pivotally interconnected members which fold to collapse the tip-up apparatus. Finally, the prior art does not disclose a tip-up apparatus which provides in combination means to activate the light emitter when the tripper assembly is actuated, a wireless signal indicating the tripper assembly has been actuated, and a collapsible structure as described.

(h) BRIEF SUMMARY OF THE INVENTION

An embodiment of the disclosure meets the needs presented above by generally comprising a base. An indicator is coupled to the base and is movable between a retracted position and an extended position with respect to the base, with the indicator being biased toward the extended position. A tripper assembly is coupled to the base and is engageable with the indicator to retain the indicator in the retracted position and actuatable to release the indicator from the retracted position. A housing is coupled to the tripper assembly, and a light emitter is mounted on the housing. A power supply is mounted in the housing and is selectively electrically couplable to the light emitter. A control circuit is mounted in the housing and is electrically coupled to the light emitter and the power supply. The control circuit is configured to electrically couple the power supply to the light emitter when the indicator is positioned in the extended position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
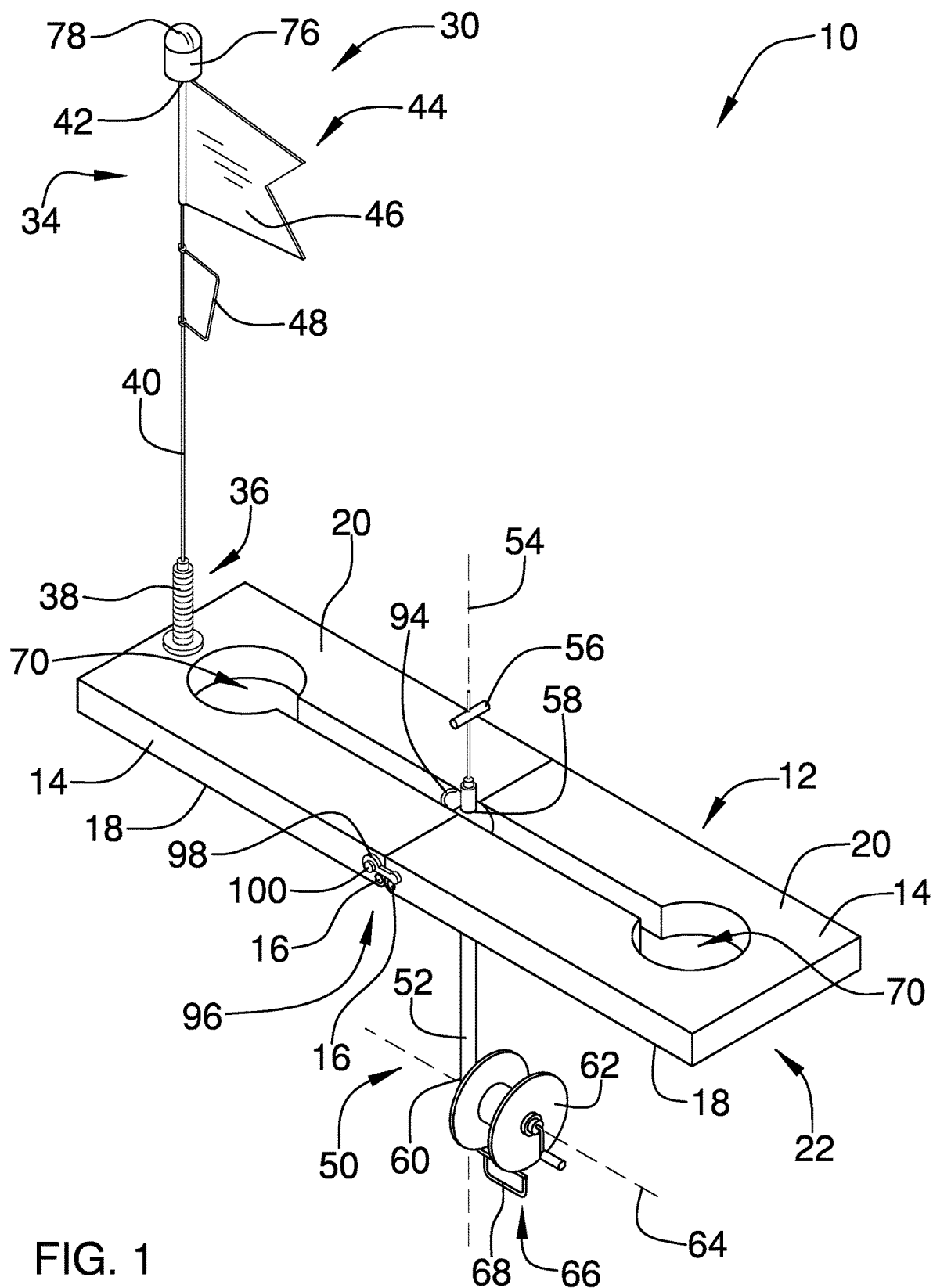
FIG. 1 is a top front side perspective view of a tip-up apparatus according to an embodiment of the disclosure.
Figure 2:
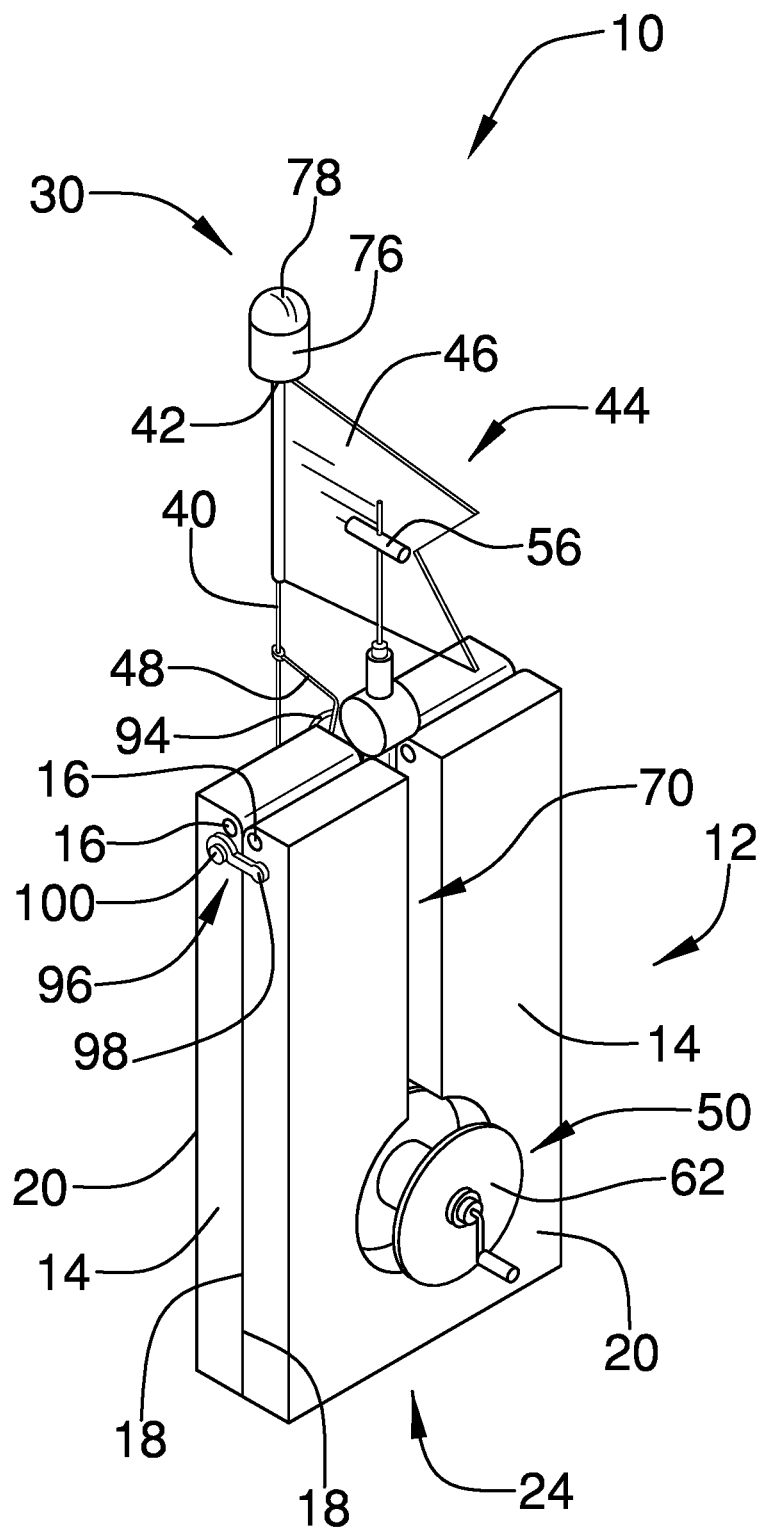
FIG. 2 is a top front side perspective view of an embodiment of the disclosure.
Figure 3:
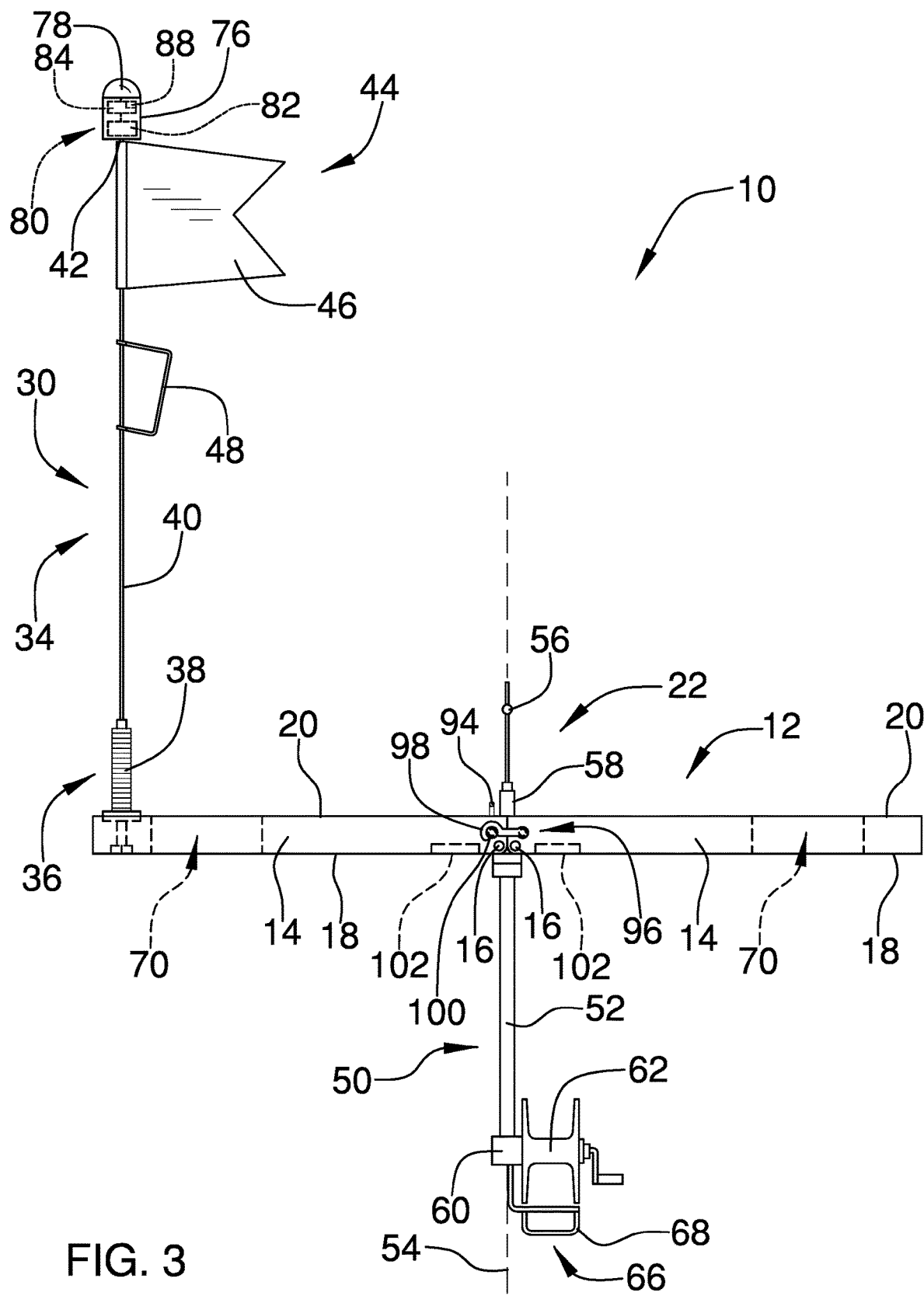
FIG. 3 is a side view of an embodiment of the disclosure.
Figure 4:
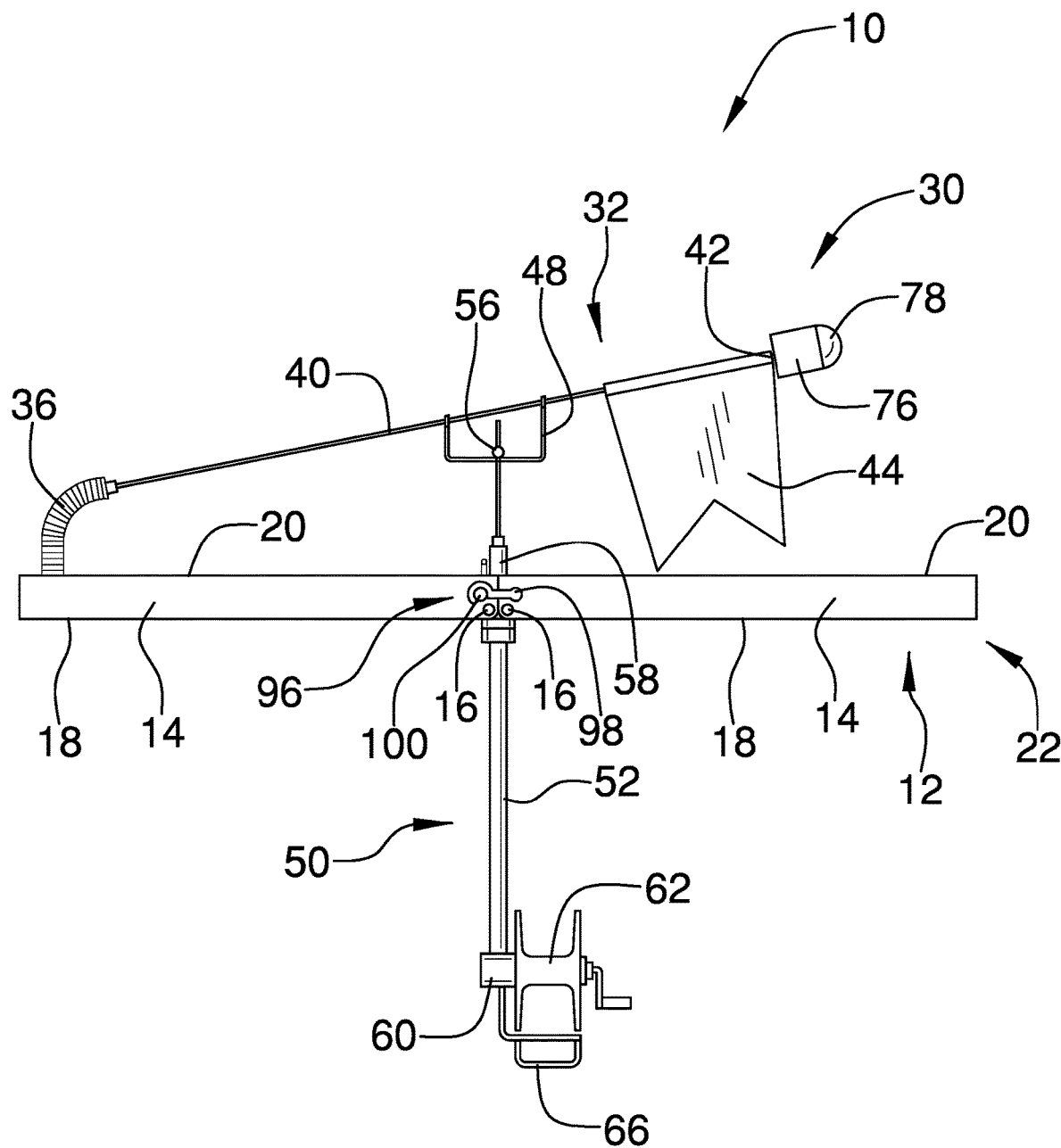
FIG. 4 is a side view of an embodiment of the disclosure.
Figure 5:
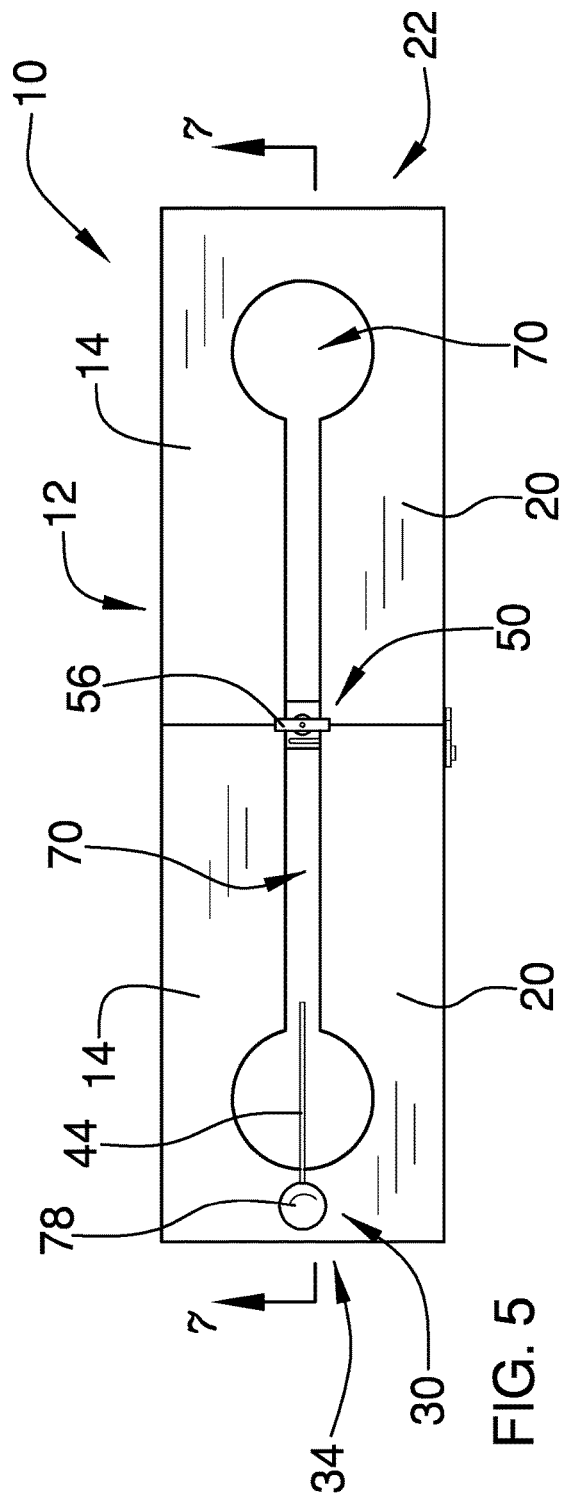
FIG. 5 is a top view of an embodiment of the disclosure.
Figure 6:
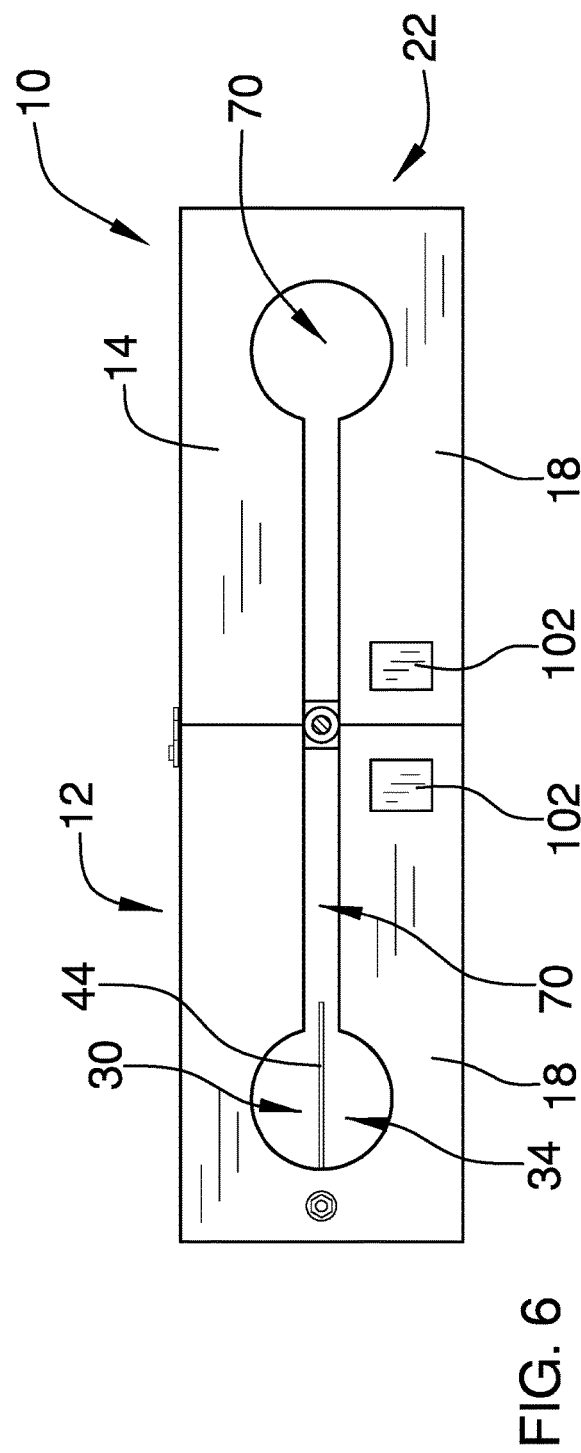
FIG. 6 is a bottom view of an embodiment of the disclosure.
Figure 7:
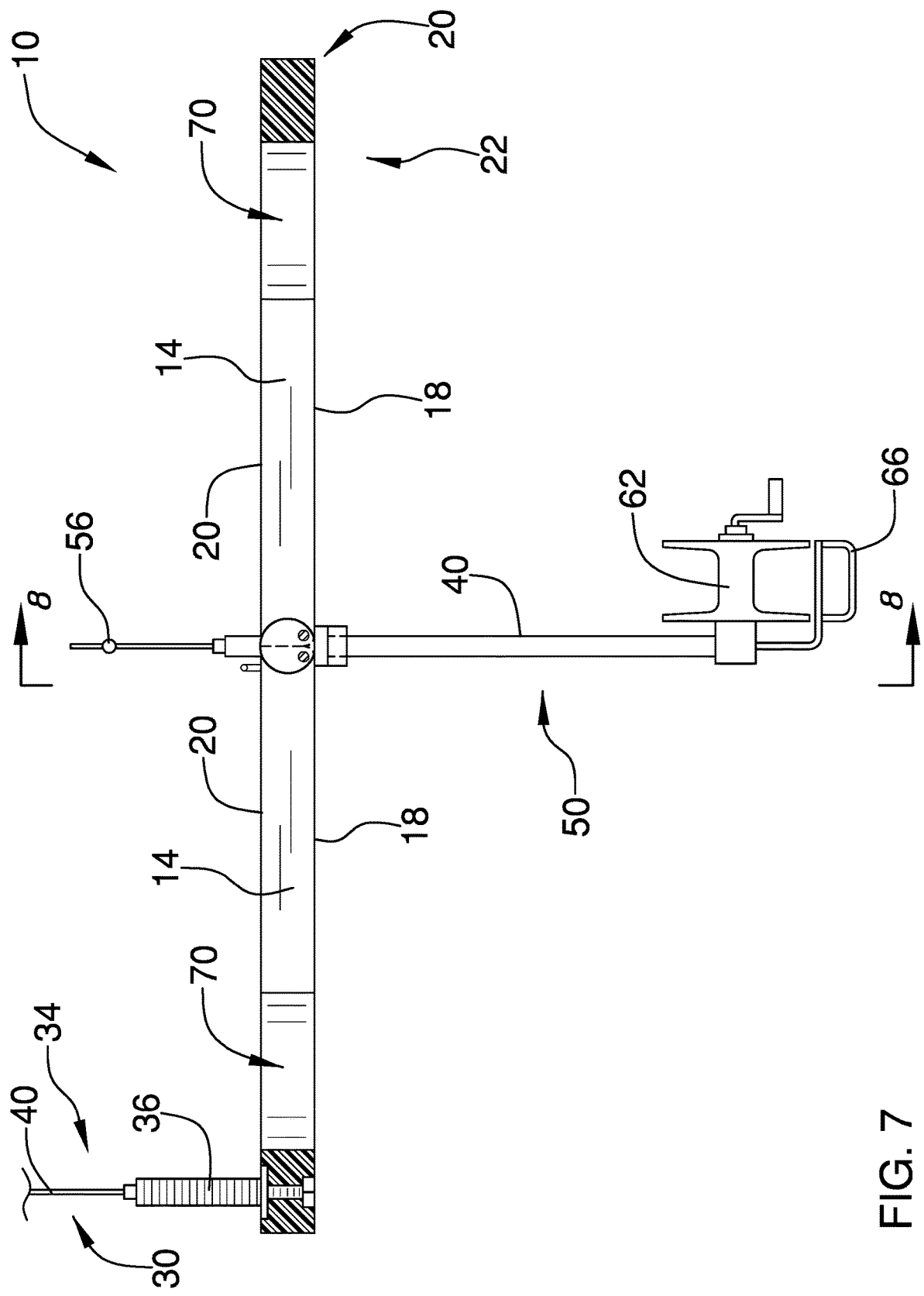
FIG. 7 is a cross-section view of an embodiment of the disclosure taken from Arrows 7-7 in FIG. 5.
Figure 8:
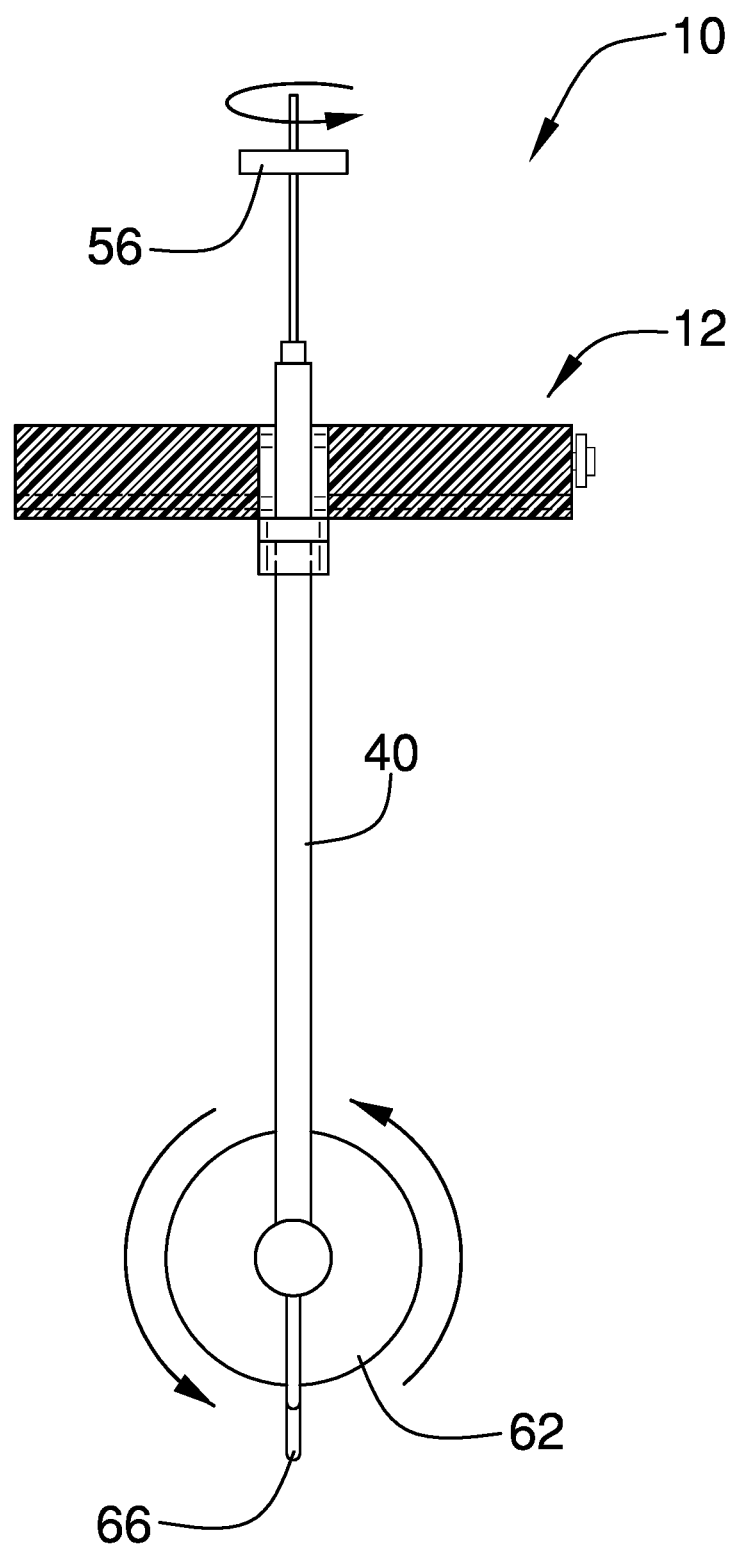
FIG. 8 is a cross-section view of an embodiment of the disclosure taken from Arrows 8-8 in FIG. 7.
Figure 9:
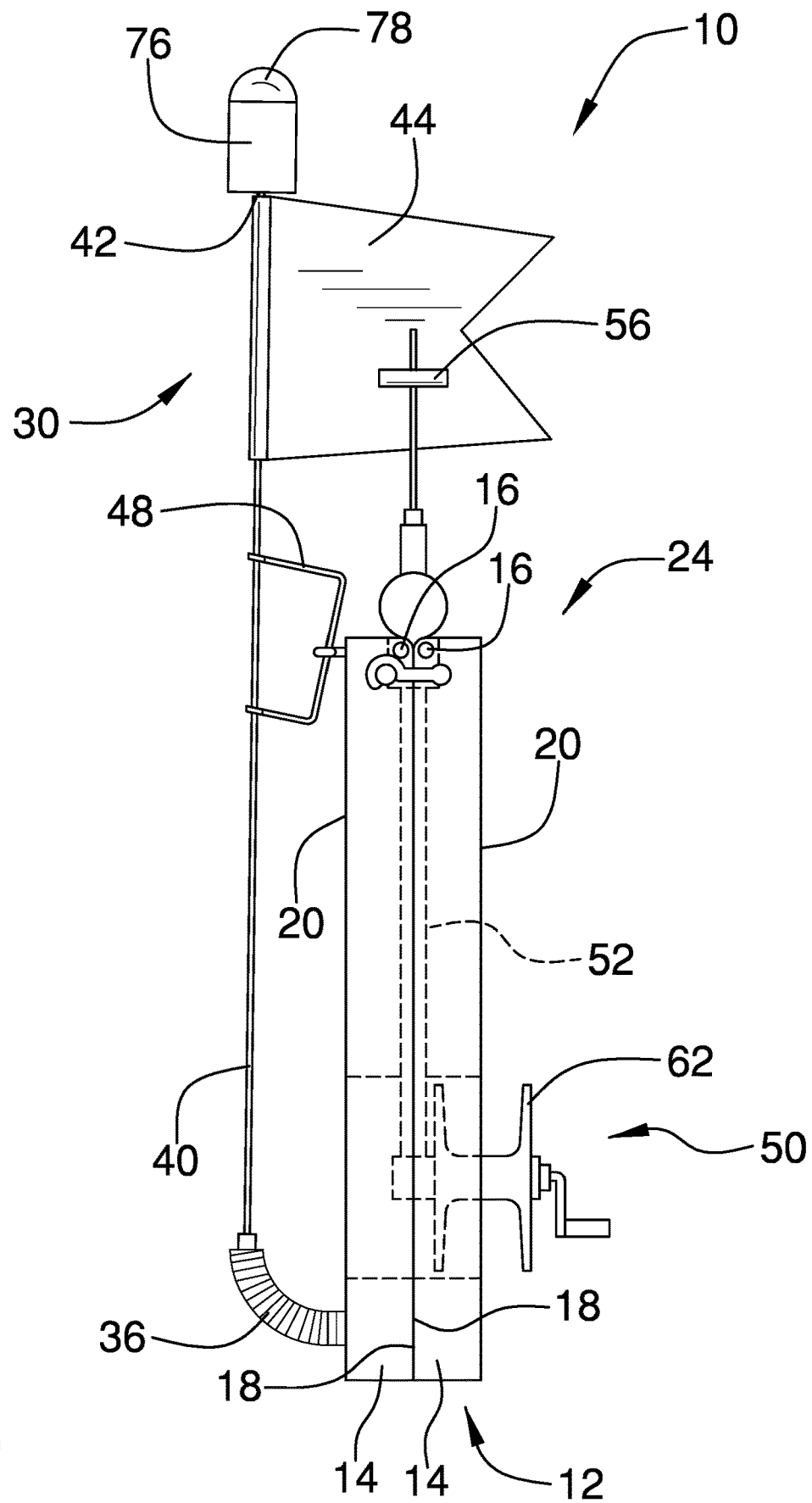
FIG. 9 is a side view of an embodiment of the disclosure.
Figure 10:
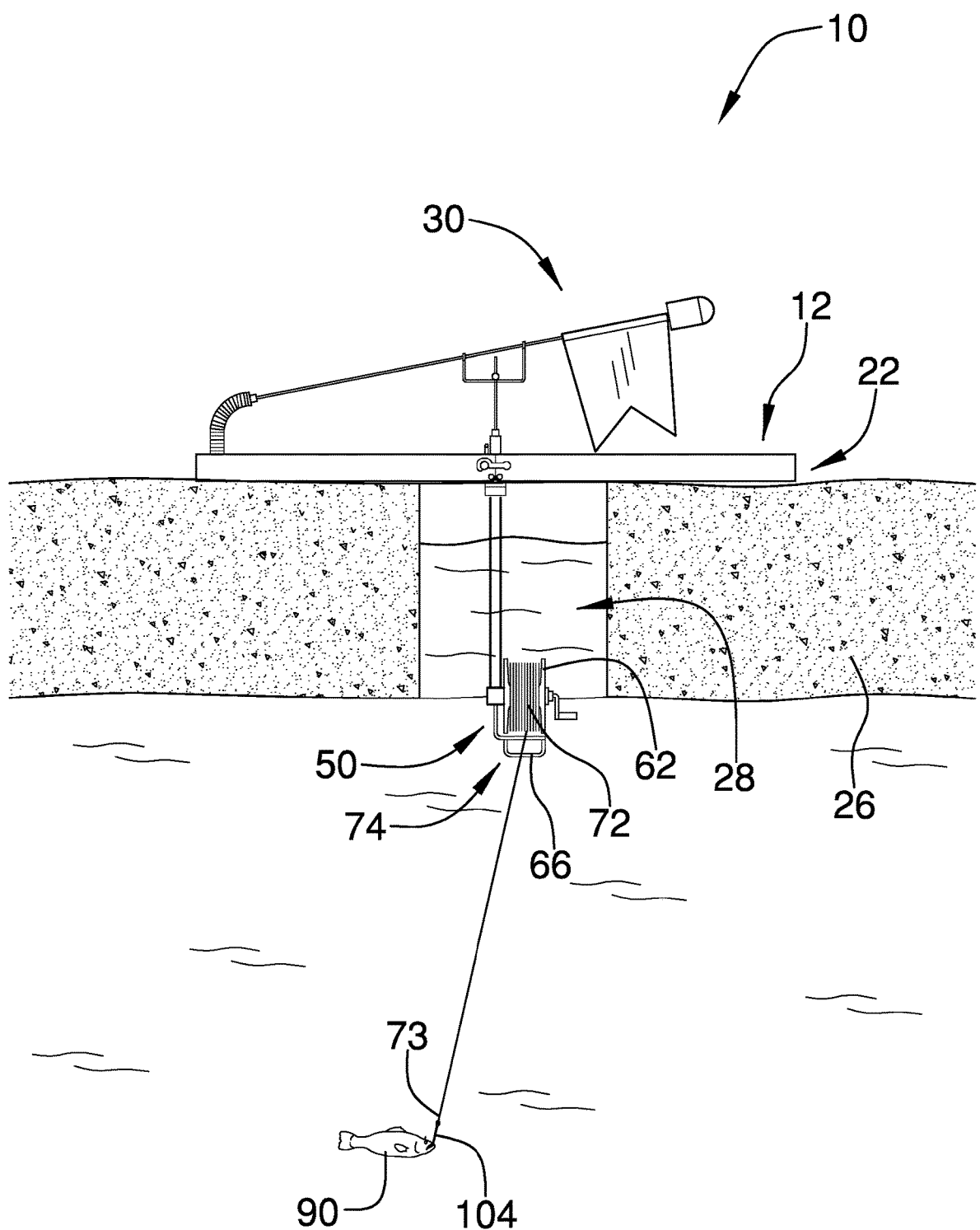
FIG. 10 is an in-use view of an embodiment of the disclosure.
Figure 11:
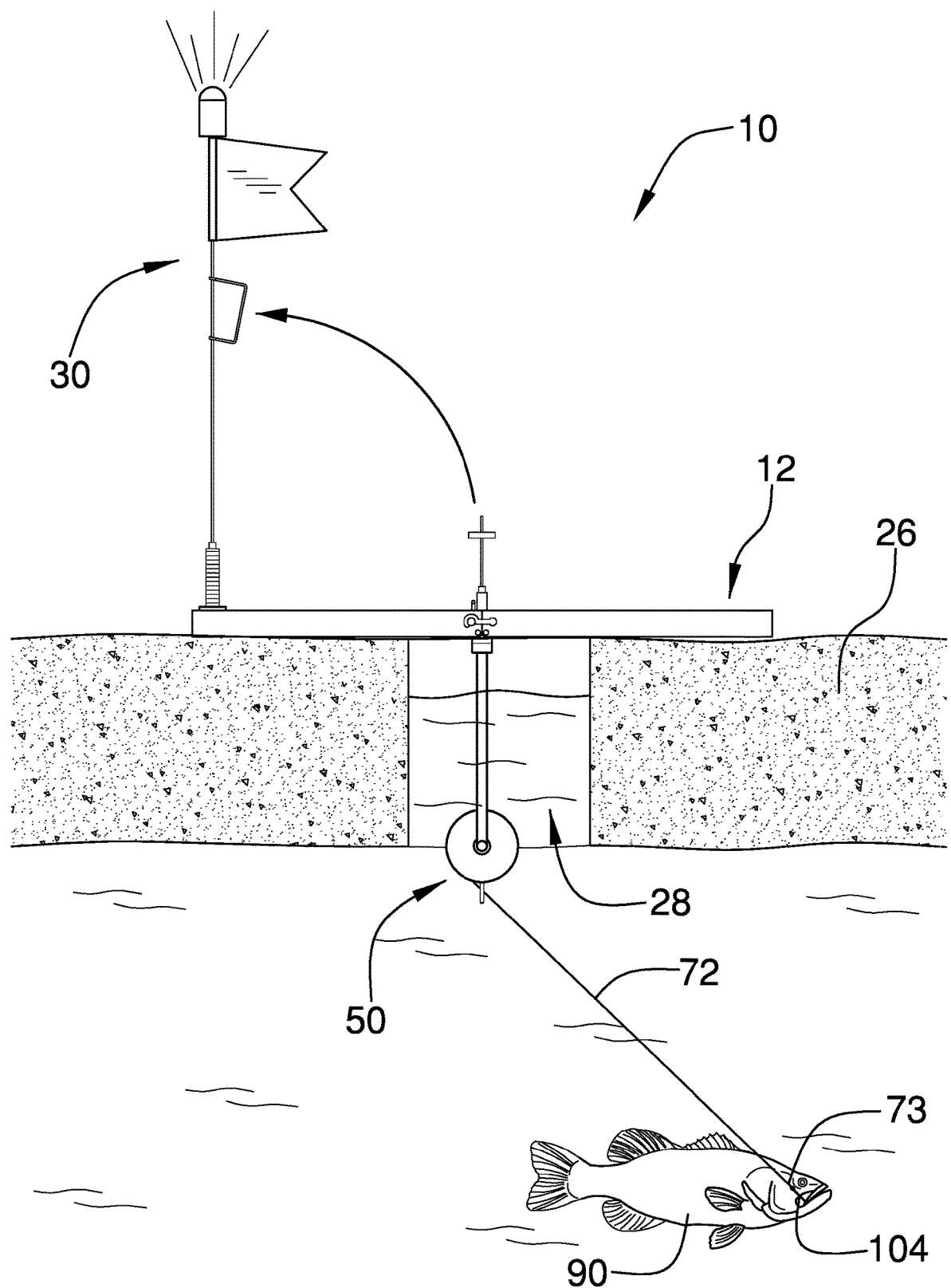
FIG. 11 is an in-use view of an embodiment of the disclosure.
Figure 12:
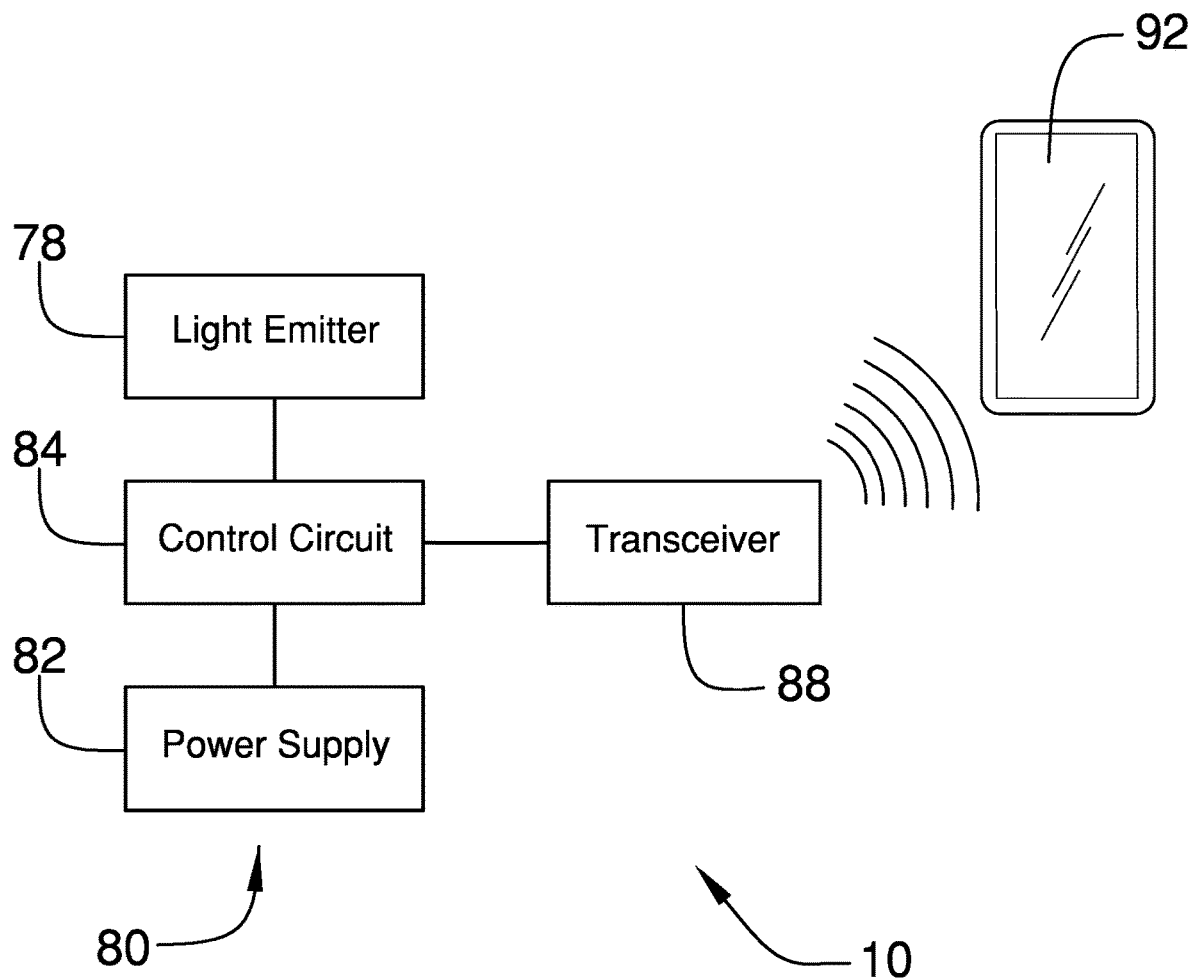
FIG. 12 is a block diagram of an embodiment of the disclosure.

With reference now to the drawings, and in particular to FIGS. 1 through 12 thereof, a new tip-up apparatus embodying the principles and concepts of an embodiment of the disclosure and generally designated by the reference numeral 10 will be described.

As best illustrated in FIGS. 1 through 12, the tip-up apparatus 10 generally comprises a base 12 comprising a pair of support members 14. The pair of support members 14 is pivotally interconnected, and each support member 14 of the pair of support members 14 has a first surface 18 and a second surface 20 opposing each other. The base 12 is positionable in a deployed configuration 22 wherein the first surfaces 18 of the pair of support members 14 are coplanar with each other and extend away from each other. The base 12 is also positionable in a folded configuration 24 wherein the first surfaces 18 of the pair of support members 14 face each other. The pair of first surfaces 18 of the pair of support members 14 abut each other when the base 12 is positioned in the folded configuration 24. The base 12 is configured for positioning over a hole 28 in an ice sheet 26 when positioned in the deployed configuration 22.

An indicator 30 is coupled to the base 12 and is movable between a retracted position 32 and an extended position 34 with respect to the base 12, with the indicator 30 being biased toward the extended position 34. The indicator 30 comprises a resiliently bendable member 36, a rod 40, an alert member 44, and a catch 48. The resiliently bendable member 36 is coupled to and extends away from the second surface 20 of one of the plurality of support members 14 of the base 12 when the indicator 30 is in the extended position 34. The resiliently bendable member 36 biases the indicator 30 toward the extended position 34 and comprises a tension spring 38. The rod 40 is coupled to the resiliently bendable member 36 opposite the base 12 and extends away from the base 12 when the indicator 30 is in the extended position 34. A distal end 42 of the rod 40 with respect to the base 12 is positioned adjacent to the base 12 when the indicator 30 is in the retracted position 32. In some embodiments, the indicator 30 may be biased to move linearly between the retracted position 32 and the extended position 34.

The alert member 44 is coupled to the rod 40 adjacent to the distal end 42 of the rod 40. The alert member 44 is visually prominent with respect to the rod 40. The alert member 44 comprises a flag 46 but may comprise any visually distinctive shape relative to the rod 40 such that it is apparent from a distance whether the indicator 30 is in the extended position 34 or the retracted position 32. The alert member 44 may have a color different from a color of the rod 40, and the color of the alert member 44 may also be configured to be different from a surrounding environment in which the tip—up apparatus 10 is used. The alert member 44 may also have a width taken perpendicularly to a longitudinal axis of the rod 40 member which is greater than a width of the rod 40 member. The catch 48 is coupled to the rod 40 for retaining the indicator 30 in the retracted position 32.

A tripper assembly 50 is coupled to the base 12 and is engageable with the indicator 30 to retain the indicator 30 in the retracted position 32 and actuatable to release the indicator 30 from the retracted position 32. The tripper assembly 50 comprises an arm 52, an engagement member 56, a spool 62, and a line guide 66. The arm 52 is coupled to and extends away from the base 12 and is rotatable around a rotational axis 54 intersecting the base 12. The arm 52 extends away from the second surfaces 20 of the pair of support members 14 when the base 12 is positioned in the deployed configuration 22. The engagement member 56 is coupled to a proximal end 58 of the arm 52 with respect to the base 12 and is engageable with the catch 48 of the indicator 30 to retain the indicator 30 in the retracted position 32. The engagement member 56 disengages the catch 48 when the arm 52 is rotated about the rotational axis 54.

The support members 14 pivot with respect to each other via a pair of pins 16, wherein each pin 16 of the pair of pins 16 extends through an associated one of the support members 14 and through the tripper assembly 50. In some embodiments, a separate link may couple the support members 14 via the pins 16, and the tripper assembly 50 may be coupled to the separate link. In such arrangements, the pins 16, which may comprise metal material, are kept away from the ice sheet 26 when the base 12 is positioned in the deployed configuration 22, thereby preventing corrosion of the pins 16.

The spool 62 is rotatably coupled to a distal end 60 of the arm 52 with respect to the base 12 and is configured for holding a fishing line 72 in a wound condition 74. The spool 62 is rotatable around a spool axis 64 which is perpendicular to the rotational axis 54 of the arm 52. The line guide 66 is coupled to the arm 52 and is positioned adjacent to the spool 62. The line guide 66 forms a loop 68 configured for receiving the fishing line 72 to facilitate inhibiting tangling of the fishing line 72. The arm 52 is pivotally coupled to each support member 14 of the pair of support members 14 such that the pair of support members 14 of the base 12 pivot toward the distal end 60 of the arm 52 when the base 12 is moved from the deployed configuration 22 to the folded configuration 24. Each support member 14 of the pair of support members 14 of the base 12 has an opening 70 for accommodating the tripper assembly 50 when the base 12 is positioned in the folded configuration 24.

A housing 76 is coupled to the tripper assembly 50 and is positioned on the distal end 42 of the rod 40. A light emitter 78 is mounted on the housing 76. A power supply 80 is mounted in the housing 76 and is selectively electrically couplable to the light emitter 78 to activate the light emitter 78. The power supply 80 comprises a battery 82. A control circuit 84 is mounted in the housing 76 and is electrically coupled to the light emitter 78 and the power supply 80. The control circuit 84 is configured to electrically couple the power supply 80 to the light emitter 78 when the indicator 30 is positioned in the extended position 34. The control circuit 84 includes a mercury tilt switch but may include a different conventional switch, a positional sensor, an accelerometer, a proximity sensor, or the like.

A transceiver 88 is electrically coupled to the control circuit 84 wherein the control circuit 84 is configured for wirelessly communicating a signal indicative of a fish 90 pulling on the fishing line 72 to a remote electronic device 92. The control circuit 84 communicating the signal when the indicator 30 is positioned in the extended position 34. The remote electronic device 92 may be a smartphone, a tablet, a personal computer, or the like, and the remote electronic device 92 may be programmed to alert a user that the fish 90 is pulling on the fishing line 72 via one or more of an audible alert, a visual notification, a vibration alarm, and the like. The transceiver 88 may communicate to the remote electronic device 92 via a personal area network following a Bluetooth communications protocol or the like.

A storage hook 94 is coupled to the base 12 and is positioned such that the catch 48 of the indicator 30 is engageable with the storage hook 94 to retain the indicator 30 in the retracted position 32 when the base 12 is positioned in the folded configuration 24. A latch 96 is coupled to the base 12 to retain the base 12 alternately in each of the deployed configuration 22 and the folded configuration 24. The latch 96 comprises a hook 98 mounted to one of the pair of support members 14 of the base 12 and a protrusion 100 mounted to another of the pair of support members 14. The hook 98 and the protrusion 100 are positioned relative to each other such that the hook 98 and the protrusion 100 are engageable with each other when the base 12 is positioned alternately in the deployed configuration 22 and the folded configuration 24. A pair of magnets 102 is also coupled to the base 12. Each magnet 102 of the pair of magnets 102 is positioned in the first surface 18 of an associated one of the pair of support members 14. Each magnet 102 of the pair of magnets 102 is configured to have a fishhook 104 magnetically adhered to the magnet 102 to store the fishhook 104.

In use, the fishing line 72 is positioned in the wound condition 74 on the spool 62 and threaded through the line guide 66. The fishhook 104 is attached to a free end 73 of the fishing line 72. The base 12 is positioned in the deployed configuration 22 over the hole 28 in the ice sheet 26, and the spool 62 is inserted downwardly through the hole 28 in the ice sheet 26. The indicator 30 is positioned in the retracted position 32, and the engagement member 56 of the tripper assembly 50 is placed in engagement with the catch 48 of the indicator 30 to retain the indicator 30 in the retracted position 32. When the fish 90 pulls on the fishing line 72 such that the arm 52 of the tripper assembly 50 rotates, the engagement member 56 is rotated out of engagement with the catch 48 and releases the indicator 30. The indicator 30 biasedly moves to the extended position 34, which causes the mercury tilt switch to couple the power supply 80 to the light emitter 78 and the transceiver 88. The control circuit 84 transmits the signal indicative of the fish 90 pulling on the fishing line 72 to the remote electronic device 92 via the transceiver 88.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A tip-up apparatus for indicating when a fish pulls on a fishing line, the apparatus comprising:
    a base;
    an indicator being coupled to the base, the indicator being movable between a retracted position and an extended position with respect to the base, the indicator being biased toward the extended position;
    a tripper assembly being coupled to the base and being engageable with the indicator to retain the indicator in the retracted position and actuatable to release the indicator from the retracted position;
    a housing being coupled to the tripper assembly;
    a light emitter being mounted on the housing;
    a power supply being mounted in the housing and being selectively electrically couplable to the light emitter; and
    a control circuit mounted in the housing and being electrically coupled to the light emitter and the power supply, the control circuit being configured to electrically couple the power supply to the light emitter when the indicator is positioned in the extended position;
    wherein the base comprises a pair of support members, the pair of support members being pivotally interconnected, each support member of the pair of support members having a first surface and a second surface opposing each other, the base being positionable in a deployed configuration wherein the first surfaces of the air of support members are coplanar with each other and extend away from each other, the base being positionable in a folded configuration wherein the first surfaces of the pair of support members face each other, the base being configured for positioning over a hole in an ice sheet when positioned in the deployed configuration; and
    a latch being coupled to the base to retain the base alternately in each of the deployed configuration and the folded configuration.

2. The apparatus of claim 1, wherein the pair of first surfaces of the pair of support members abut each other when the base is positioned in the folded configuration.

3. The apparatus of claim 1, wherein the power supply comprises a battery.

4. The apparatus of claim 1, wherein the control circuit includes a mercury tilt switch.

5. The apparatus of claim 1, further comprising a transceiver being electrically coupled to the control circuit wherein the control circuit is configured for wirelessly communicating a signal indicative of the fish pulling on the fishing line to a remote electronic device, the control circuit communicating the signal when the indicator is positioned in the extended position.

6. The apparatus of claim 1, wherein the latch comprises a hook mounted to one of the pair of support members of the base and a protrusion mounted to another of the pair of support members, the hook and the protrusion being positioned relative to each other such that the hook and the protrusion are engageable with each other when the base is positioned alternately in the deployed configuration and the folded configuration.

7. The apparatus of claim 1, further comprising a magnet being coupled to the base, the magnet being configured to have a fishhook magnetically adhered to the magnet.

8. A tip-up apparatus for indicating when a fish pulls on a fishing line, the apparatus comprising:
    a base;
    an indicator being coupled to the base, the indicator being movable between a retracted position and an extended position with respect to the base, the indicator being biased toward the extended position;
    a tripper assembly being coupled to the base and being engageable with the indicator to retain the indicator in the retracted position and actuatable to release the indicator from the retracted position;
    a housing being coupled to the tripper assembly;
    a light emitter being mounted on the housing;
    a power supply being mounted in the housing and being selectively electrically couplable to the light emitter; and
    a control circuit mounted in the housing and being electrically coupled to the light emitter and the power supply, the control circuit being configured to electrically couple the power supply to the light emitter when the indicator is positioned in the extended position;

wherein the base comprises a pair of support members, the pair of support members being pivotally interconnected, each support member of the pair of support members having a first surface and a second surface opposing each other, the base being positionable in a deployed configuration wherein the first surfaces of the pair of support members are coplanar with each other and extend away from each other, the base being positionable in a folded configuration wherein the first surfaces of the pair of support members face each other, the base being configured for positioning over a hole in an ice sheet when positioned in the deployed configuration;

wherein the indicator comprises:
- a resiliently bendable member being coupled to and extending away from the second surface of one of the plurality of support members of the base when the indicator is in the extended position, the resiliently bending member biasing the indicator toward the extended position;
- a rod being coupled to the resiliently bendable member opposite the base and extending away from the base when the indicator is in the extended position, the resiliently bendable member being bendable to position a distal end of the rod with respect to the base adjacent to the base when the indicator is in the retracted position; and
- a catch being coupled to the rod for retaining the indicator in the retracted position;

wherein the tripper assembly comprises:
- an arm being coupled to and extending away from the base, the arm being rotatable around a rotational axis intersecting the base, the arm extending away from the second surfaces of the pair of support members when the base is positioned in the deployed configuration;
- an engagement member being coupled to a proximal end of the arm with respect to the base, the engagement member being engageable with the catch of the indicator to retain the indicator in the retracted position, the engagement member disengaging the catch when the arm is rotated about the rotational axis; and
- a spool being rotatably coupled to a distal end of the arm with respect to the base, the spool being configured for holding the fishing line in a wound condition; and wherein each support member of the pair of support members of the base has an opening for accommodating the tripper assembly when the base is positioned in the folded configuration.

9. The apparatus of claim 8, wherein the resiliently bendable member comprises a tension spring.

10. The apparatus of claim 8, wherein the indicator further comprises an alert member being coupled to the rod adjacent to the distal end of the rod, the alert member being visually prominent with respect to the rod.

11. The apparatus of claim 10, wherein the alert member comprises a flag.

12. The apparatus of claim 8, wherein the spool is rotatable around a spool axis which is perpendicular to the rotational axis of the arm.

13. The apparatus of claim 8, wherein the tripper assembly further comprises a line guide being coupled to the arm and being positioned adjacent to the spool, the line guide forming a loop configured for receiving the fishing line to facilitate inhibiting tangling of the fishing line.

14. The apparatus of claim 8, wherein the housing is positioned on the distal end of the rod.

15. The apparatus of claim 8, further comprising a storage hook being coupled to the base, the storage hook being positioned such that the catch of the indicator is engageable with the storage hook to retain the indicator in the retracted position when the base is positioned in the folded configuration.

16. A tip-up apparatus for indicating when a fish pulls on a fishing line, the apparatus comprising:
- a base;
- an indicator being coupled to the base, the indicator being movable between a retracted position and an extended position with respect to the base, the indicator being biased toward the extended position;
- a tripper assembly being coupled to the base and being engageable with the indicator to retain the indicator in the retracted position and actuatable to release the indicator from the retracted position;
- a housing being coupled to the tripper assembly;
- a light emitter being mounted on the housing;
- a power supply being mounted in the housing and being selectively electrically couplable to the light emitter; and
- a control circuit mounted in the housing and being electrically coupled to the light emitter and the power supply, the control circuit being configured to electrically couple the power supply to the light emitter when the indicator is positioned in the extended position;

wherein the base comprises a pair of support members, the pair of support members being pivotally interconnected, each support member of the pair of support members having a first surface and a second surface opposing each other, the base being positionable in a deployed configuration wherein the first surfaces of the pair of support members are coplanar with each other and extend away from each other, the base being positionable in a folded configuration wherein the first surfaces of the pair of support members face each other, the base being configured for positioning over a hole in an ice sheet when positioned in the deployed configuration; and a pair of magnets being coupled to the base, each magnet of the pair of magnets being positioned in the first surface of an associated one of the pair of support members, each magnet of the pair of magnets being configured to have a fishhook magnetically adhered to the magnet.

17. The apparatus of claim 16, further comprising:
the indicator comprising:
- a resiliently bendable member being coupled to and extending away from the second surface of one of the plurality of support members of the base when the indicator is in the extended position, the resiliently bending member biasing the indicator toward the extended position, the resiliently bendable member comprising a tension spring;
- a rod being coupled to the resiliently bendable member opposite the base and extending away from the base when the indicator is in the extended position, the resiliently bendable member being bendable to position a distal end of the rod with respect to the base adjacent to the base when the indicator is in the retracted position;
- an alert member being coupled to the rod adjacent to the distal end of the rod, the alert member being visually prominent with respect to the rod, the alert member comprising a flag; and a catch being coupled to the rod for retaining the indicator in the retracted position;

the tripper assembly comprising:

an arm being coupled to and extending away from the base, the arm being rotatable around a rotational axis intersecting the base, the arm extending away from the second surfaces of the pair of support members when the base is positioned in the deployed configuration;

an engagement member being coupled to a proximal end of the arm with respect to the base, the engagement member being engageable with the catch of the indicator to retain the indicator in the retracted position, the engagement member disengaging the catch when the arm is rotated about the rotational axis;

a spool being rotatably coupled to a distal end of the arm with respect to the base, the spool being configured for holding the fishing line in a wound condition, the spool being rotatable around a spool axis which is perpendicular to the rotational axis of the arm; and a line guide being coupled to the arm and being positioned adjacent to the spool, the line guide forming a loop configured for receiving the fishing line to facilitate inhibiting tangling of the fishing line;

each support member of the pair of support members of the base having an opening for accommodating the tripper assembly when the base is positioned in the folded configuration;

the housing being positioned on the distal end of the rod;

the power supply comprising a battery;

the control circuit including a mercury tilt switch;

a transceiver being electrically coupled to the control circuit wherein the control circuit is configured for wirelessly communicating a signal indicative of the fish pulling on the fishing line to a remote electronic device, the control circuit communicating the signal when the indicator is positioned in the extended position;

a storage hook being coupled to the base, the storage hook being positioned such that the catch of the indicator is engageable with the storage hook to retain the indicator in the retracted position when the base is positioned in the folded configuration; and a latch being coupled to the base to retain the base alternately in each of the deployed configuration and the folded configuration, the latch comprising a hook mounted to one of the pair of support members of the base and a protrusion mounted to another of the pair of support members, the hook and the protrusion being positioned relative to each other such that the hook and the protrusion are engageable with each other when the base is positioned alternately in the deployed configuration and the folded configuration.

* * * * *